US011894687B2

(12) United States Patent
Yu et al.

(10) Patent No.: US 11,894,687 B2
(45) Date of Patent: Feb. 6, 2024

(54) METHOD OF RANKING MLPE APPARATUSES AND LOCATING DEVICES IN A PHOTOVOLTAIC STRING

(71) Applicant: Sungrow Power Supply Co., Ltd., Anhui (CN)

(72) Inventors: Yanfei Yu, Anhui (CN); Anying Jiang, Anhui (CN); Xinyu Wang, Anhui (CN); Xiaoxun Li, Anhui (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 41 days.

(21) Appl. No.: 17/404,181

(22) Filed: Aug. 17, 2021

(65) Prior Publication Data

US 2022/0069586 A1 Mar. 3, 2022

(30) Foreign Application Priority Data

Aug. 26, 2020 (CN) ........................ 202010869819.7

(51) Int. Cl.
*H02J 3/40* (2006.01)
*H02J 3/38* (2006.01)
(Continued)

(52) U.S. Cl.
CPC ................ *H02J 3/40* (2013.01); *H02J 3/381* (2013.01); *H02S 40/30* (2014.12); *H02S 50/10* (2014.12); *H02J 2300/24* (2020.01)

(58) Field of Classification Search
None
See application file for complete search history.

(56) References Cited

U.S. PATENT DOCUMENTS 9,590,559 B2 * 3/2017 Jarnason ........... H01L 31/02021
10,126,131 B2 * 11/2018 Chapman .............. G01C 21/20
(Continued)

FOREIGN PATENT DOCUMENTS

CN 103248399 A 8/2013
JP S62-213426 A 9/1987
(Continued)

OTHER PUBLICATIONS

Extended European Search Report for European Application No. 21191001.3, dated Jan. 25, 2022.
(Continued)

*Primary Examiner* — Mohammad Ali
*Assistant Examiner* — Kelvin Booker
(74) *Attorney, Agent, or Firm* — Wolf, Greenfield & Sacks, P.C.

(57) ABSTRACT

A photovoltaic system, a method for locating devices in a photovoltaic string, a MLPE apparatus, and a method for ranking MLPE apparatuses. Each MLPE apparatus sends, actively according to a predetermine rule, an initial message to the other MLPE apparatuses. The initial message includes a serial number corresponding to said MLPE apparatus and an accumulated operation duration of said MLPE apparatus. The MLPE apparatuses determine the rank of the accumulated operation duration of each MLPE apparatus according to the initial messages sent from all MLPE apparatuses. After each MLPE apparatus communicates with a communication host, the MLPE apparatuses reports the rank of the accumulated operation duration of each MLPE apparatus to the communication host. Thereby, the communication host may determine a physical location of each device in the photovoltaic string according to the ranks of the accumulated operation durations and a sequence of installing positions of the devices in the photovoltaic string.

14 Claims, 11 Drawing Sheets

Start

Each MLPE apparatus sends an initial message to each other MLPE apparatus according to a predetermined rule — S101

The MLPE apparatuses determine a rank of an accumulated operation duration of each MLPE apparatus according to the initial messages sent from all MLPE apparatuses — S102

The MLPE apparatuses communicate with a communication host of a photovoltaic system and report the rank of the accumulated operation duration of each MLPE apparatus to the communication host — S103

End

(51) Int. Cl.
*H02S 40/30* (2014.01)
*H02S 50/10* (2014.01)

(56) References Cited

U.S. PATENT DOCUMENTS

| | | | | |
|---|---|---|---|---|
| 10,365,309 | B2 * | 7/2019 | Charles | H02S 40/32 |
| 11,329,604 | B2 * | 5/2022 | Zhao | H02S 40/32 |
| 2010/0156650 | A1 * | 6/2010 | Stern | H04Q 9/00 340/657 |
| 2011/0276269 | A1 * | 11/2011 | Hummel | G01W 1/10 702/3 |
| 2011/0282600 | A1 * | 11/2011 | Roesner | H02S 50/10 707/802 |
| 2013/0346054 | A1 | 12/2013 | Mumtaz | |
| 2014/0149076 | A1 * | 5/2014 | Jarnason | H04Q 9/00 702/182 |
| 2017/0115119 | A1 * | 4/2017 | Chapman | G01C 21/20 |
| 2017/0176504 | A1 * | 6/2017 | Charles | G01R 21/133 |
| 2017/0207693 | A1 * | 7/2017 | Geng | H02M 7/44 |
| 2017/0237262 | A1 * | 8/2017 | Geng | H02H 3/353 307/84 |
| 2017/0294875 | A1 * | 10/2017 | Xu | H02J 3/46 |
| 2017/0363666 | A1 * | 12/2017 | Alkuran | H02J 13/00017 |
| 2018/0034411 | A1 * | 2/2018 | Charles | H02S 50/10 |
| 2018/0054057 | A1 * | 2/2018 | Xu | H02J 3/381 |
| 2018/0054065 | A1 * | 2/2018 | Yang | H02J 3/1842 |
| 2018/0278206 | A1 * | 9/2018 | Tan | H02S 50/00 |
| 2018/0342873 | A1 * | 11/2018 | Wang | H02S 40/34 |
| 2019/0036481 | A1 * | 1/2019 | Chapman | H02M 3/33573 |
| 2020/0204111 | A1 * | 6/2020 | Zhao | H02S 50/00 |
| 2020/0235699 | A1 | 7/2020 | Bintz et al. | |

FOREIGN PATENT DOCUMENTS

| | | | |
|---|---|---|---|
| JP | H05-046360 | A | 2/1993 |
| JP | H07-336897 | A | 12/1995 |
| JP | H08-098549 | A | 4/1996 |
| JP | H09-182279 | A | 7/1997 |
| JP | 2004-015868 | A | 1/2004 |
| JP | 2008-153383 | A | 7/2008 |
| JP | 2010-220446 | A | 9/2010 |
| JP | 2012-204571 | A | 10/2012 |
| JP | 2014-099571 | A | 5/2014 |
| JP | 2014-147235 | A | 8/2014 |
| JP | 2020-099190 | A | 6/2020 |
| WO | WO 2013/051157 | A1 | 4/2013 |
| WO | WO 2019/027079 | A1 | 2/2019 |

OTHER PUBLICATIONS

Notice of Reasons for Refusal for Japanese Application No. 2021-135731, dated Jul. 26, 2022.

* cited by examiner

1 #2 #3 #4 #5 #6

3 9 11 4 7 5

12 #11 #10 #9 #8 #7

2 6 12 1 8 10

METHOD OF RANKING MLPE APPARATUSES AND LOCATING DEVICES IN A PHOTOVOLTAIC STRING

The present disclosure claims the priority to Chinese Patent Application No. 202010869819.7, titled "PHOTOVOLTAIC SYSTEM. METHOD FOR LOCATING DEVICES IN PHOTOVOLTAIC STRING, MLPE APPARATUS AND METHOD FOR RANKING MLPE APPARATUSES", filed on Aug. 26, 2020 with the China National Intellectual Property Administration, the content of which is incorporated herein by reference.

FIELD

The present disclosure relates to the technical field of photovoltaic power generation, and in particular to a photovoltaic system, a method for locating devices in a photovoltaic string, a MLPE apparatus, and a method for ranking MLPE apparatuses.

BACKGROUND

At present, module level power electronics (MLPE) apparatuses are increasingly widespread in photovoltaic systems. The MLPE apparatus may be configured to perform maximum power point tracking, rapid shutdown, data collection, data monitoring, or other operations on a photovoltaic module.

Generally, one or more photovoltaic modules are provided with one MLPE apparatus, and there is a large quantity of MLPE apparatuses in a photovoltaic system. In order to facilitate post-installation operations such as maintenance, it is necessary to acquire an accurate position of each MLPE apparatus.

In conventional technology, a corresponding label code (for example, a two-dimensional code, or a bar code) is usually pasted on each MLPE apparatus. When installing the MLPE apparatuses, installation personnel tear off the label code from each MLPE apparatus, and paste the label code on a piece of paper on which a position of the MLPE apparatus is marked. After all MLPE apparatuses are installed, the installation position of each MLPE apparatus is recorded into an upper computer according to the piece of paper on which the label codes are pasted.

The above method for determining installation positions of MLPE apparatuses in conventional technology is complex, resulting in long operation time and high labor costs.

SUMMARY

In view of the above, a photovoltaic system, a method for locating devices in a photovoltaic string, a MLPE apparatus, and a method for ranking MLPE apparatuses are provided according to embodiments of the present disclosure. Addressed are problems of long operation time, complex processes, and high labor costs in determining a physical position of each MLPE apparatus in conventional technology.

In order to achieve the above object, following technical solutions are provided according to embodiments of the present disclosure.

A method for ranking MLPE apparatuses is provided according to a first aspect of the present disclosure. The method is applied to MLPE apparatuses that are in communication connection with each other in a photovoltaic system. The method includes: sending, by each MLPE apparatus according to a predetermined rule, an initial message to each other MLPE apparatus, where the initial message includes a serial number corresponding to said MLPE apparatus and an accumulated operation duration of said MLPE apparatus; determining, by the MLPE apparatuses, a rank of the accumulated operation duration of each MLPE apparatus according to the initial messages sent from all MLPE apparatuses; communicating, by the MLPE apparatuses, with a communication host of the photovoltaic system; and reporting, by the MLPE apparatuses, the rank of the accumulated operation duration of each MLPE apparatus to the communication host.

In an embodiment, the initial message further includes an interim rank of the accumulated operation duration.

In an embodiment, determining, by the MLPE apparatuses, the rank of the accumulated operation duration of each MLPE apparatus according to the initial messages sent from all MLPE apparatuses includes: in response to each MLPE apparatus receiving a ranking message, comparing, by said MLPE apparatus, the accumulated operation duration included in the ranking message with the accumulated operation duration of said MLPE apparatus to obtain a first comparing result, and determining, by said MLPE apparatus, whether to adjust the interim rank of the accumulated operation duration of said MLPE apparatus based on the first comparing result. The ranking message is the initial message sent from any other MLPE apparatus.

In an embodiment, the interim rank included in the ranking message is identical to the interim rank of the accumulated operation duration of said MLPE apparatus. Determining, by said MLPE apparatus, whether to adjust the interim rank of the accumulated operation duration of said MLPE apparatus based on the result of the comparing includes: increasing the interim rank of the MLPE apparatus by 1 in response to the accumulated operation duration of said MLPE apparatus being shorter than the accumulated operation duration included in the ranking message; and keeping the interim rank of the MLPE apparatus unchanged in response to the accumulated operation duration of said MLPE apparatus being longer than the accumulated operation duration included in the ranking message. Determining, by the MLPE apparatuses, the rank of the accumulated operation duration of each MLPE apparatus according to the initial messages sent from all MLPE apparatuses further includes: determining, by each MLPE apparatus, whether the interim rank included in each initial message received within a preset period is different from the interim rank of said MLPE apparatus; and determining, by each MLPE apparatus, the interim rank of said MLPE apparatus as the rank of the accumulated operation duration of said MLPE apparatus, in response to determining that the interim rank included in each initial message received within the preset period being different from the interim rank of said MLPE apparatus.

In an embodiment, the method further includes, for each MLPE apparatus: storing, in response to receiving a ranking message, the interim rank and the accumulated operation duration included in the ranking message; in response to the interim rank included in the ranking message being identical to the interim rank of the accumulated operation duration of said MLPE apparatus, comparing the accumulated operation duration included in the ranking message with the accumulated operation duration of said MLPE apparatus to obtain a first comparing result, and increasing, by 1, the interim rank of a MLPE apparatus corresponding to the shorter accumulated operation duration in the first comparing result; and in response to the interim rank included in the ranking message being identical to any interim rank stored in said MLPE apparatus, comparing the accumulated operation duration included in the ranking message with the accumulated operation duration corresponding to said interim rank stored in said MLPE apparatus, to obtain a second comparing result, and increasing, by 1, the interim rank of a MLPE apparatus corresponding to the shorter accumulated operation duration in the second comparing result. Determining, by the MLPE apparatuses, the rank of the accumulated operation duration of each MLPE apparatus according to the initial messages sent from all MLPE apparatuses further includes: determining, by each MLPE apparatus, whether the interim rank included in each initial message received within a preset period is identical to the stored interim rank of an MLPE apparatus sending said initial message, and determining, by the MLPE apparatuses, the interim rank of each MLPE apparatus as the rank of the accumulated operation duration of said MLPE apparatus, in response to each MLPE apparatus determining that the interim rank included in each ranking message received within a preset period is identical to the stored interim rank of an MLPE apparatus sending said ranking message. The ranking message is the initial message sent from any other MLPE apparatus.

In an embodiment, before sending, by each MLPE apparatus according to the predetermined rule, the initial message to each other MLPE apparatus, the method further includes: stopping, by the MLPE apparatuses synchronously, timing the accumulated operation durations.

In an embodiment, stopping, by the MLPE apparatuses synchronously, timing the accumulated operation durations includes: stopping, by the MLPE apparatuses synchronously, timing the accumulated operation durations in response to detecting a timing-stop signal.

In an embodiment, the timing-stop signal is at least one of: a change in an output voltage, a change in an output current, a short-circuit connection, or a preset communication signal.

In an embodiment, the timing-stop signal is generated by a converter, a switch device, a synchronization device, the communication host, or a power grid, which is in a post-stage of the MLPE apparatuses of the photovoltaic system.

In an embodiment, the timing-stop signal is the short-circuit connection, and is generated by shorting a converter, shorting a switch device, or shorting the photovoltaic string.

In an embodiment, after the MLPE apparatuses stopping timing the accumulated operation durations synchronously, the method includes: determining, by the MLPE apparatuses, whether a timing-start signal is detected; resuming, by the MLPE apparatuses, timing the accumulated operation durations in response to determining that the timing-start signal is detected; and stopping, by the MLPE apparatuses synchronously, timing the accumulated operation durations in response to determining that the timing-stop signal is detected again.

In an embodiment, before the communication host acquiring the accumulated operation durations of the MLPE apparatuses, the method further includes: starting, by each MLPE apparatus, timing the accumulated operation duration in response to detecting a timing-start signal.

In an embodiment, each MLPE apparatus detects the timing-start signal by at least one of: detecting a predetermined electric change, being subject to a predetermined mechanical change, or receiving a preset signal through communication.

In an embodiment, the predetermined electric change includes: being powered, a change of an electric parameter at an input terminal, or a change of an electric parameter at an output terminal.

In an embodiment, the predetermined mechanical change includes: a predetermined component being installed or removed, a predetermined component being connected or disconnected, or a state of a predetermined component being changed.

In an embodiment, the preset signal is a signal for activating said MLPE apparatus.

In an embodiment, sending, by each MLPE apparatus according to the predetermined rule, the initial message to each other MLPE apparatus includes: sending, by each MLPE apparatus, the initial message in response to a random period lapsing after stopping timing the respective accumulated operation duration.

In an embodiment, sending, by each MLPE apparatus according to the predetermined rule, the initial message to each other MLPE apparatus includes: sending, by each MLPE apparatus, the initial message in response to a corresponding preset period lapsing after stopping timing the respective accumulated operation duration.

In an embodiment, the corresponding preset period is determined by the respective accumulated operation duration of said MLPE apparatus, or a serial number corresponding to said MLPE apparatus.

In an embodiment, sending, by each MLPE apparatus according to the predetermined rule, the initial message to each other MLPE apparatus includes: in response to receiving the respective accumulated operation duration from any other of the MLPE apparatuses, determining a sending time based on a difference between the received accumulated operation duration and the accumulated operation duration of said MLPE apparatuses, and sending the initial message at the sending time.

A method for locating devices in a photovoltaic string is further provided according to a second aspect of the present disclosure. The photovoltaic string includes MLPE apparatuses that are in communication connection with each other in a photovoltaic system. The method includes: any aforementioned method for ranking the MLPE apparatuses; and determining, by a communication host in the photovoltaic system, a physical location of each of the devices in the photovoltaic string, according to the rank of the accumulated operation duration of each MLPE apparatus and a sequence of installing positions of the devices in the photovoltaic string, where the devices are installed at the installing positions based on the sequence.

In an embodiment, determining, by the communication host, the physical location of each of the devices in the photovoltaic string includes: acquiring, by the communication host, a sequence of the MLPE apparatuses according to the rank of the accumulated operation duration of each MLPE apparatus; and mapping, by the communication host, the sequence of the MLPE apparatuses to the sequence of installing positions of the devices in the photovoltaic string, to determine the physical location of each of the devices.

In an embodiment, the devices in the photovoltaic string are photovoltaic modules, or the MLPE apparatuses in a post-stage of photovoltaic modules.

An MLPE apparatus is further provided according to a third aspect of the present disclosure, including a main circuit, a detector and a controller. The detector is configured to detect a signal. An input of the main circuit receives power from a photovoltaic module in a photovoltaic system. An output of the main circuit is connected to an output of a main circuit of another MLPE apparatus in parallel or in series, to form a photovoltaic string in the photovoltaic system. The controller is coupled to the main circuit and the detector, and is in communication connection with each other MLPE apparatus in the photovoltaic string. The controller is configured to perform any aforementioned method for ranking the MLPE apparatuses.

A photovoltaic system is further provided according to a fourth aspect of the present disclosure, including a communication host and at least one photovoltaic string. The photovoltaic string includes multiple photovoltaic modules that are connected in parallel or series via corresponding MLPE apparatuses. The communication host is in communication connection with the MLPE apparatuses, and the communication host and the MLPE apparatuses are configured to perform any aforementioned method for locating the devices in the photovoltaic string.

In an embodiment, outputs of main circuits of the MLPE apparatuses in the photovoltaic string are connected in series. The MLPE apparatus are power optimizers, rapid shutdown devices, or module monitors.

In an embodiment, outputs of main circuits of the MLPE apparatuses in the photovoltaic string are connected in parallel. The MLPE apparatuses are micro inverters.

In an embodiment, outputs of the MLPE apparatuses in each of the at least one photovoltaic string are connected in parallel. The photovoltaic system further includes a converter, configured to receive and convert power from the at least one photovoltaic string In an embodiment, the communication host is a controller in the photovoltaic system, a near-end controller in communication connection with a controller in the photovoltaic system, or a remote server, a cloud server, or a display terminal in communication connection with a controller.

In an embodiment, the controller in the photovoltaic system is an independent system controller, or an internal controller of a converter.

The method for ranking MLPE apparatuses is provided according to embodiments of the present disclosure. Each MLPE apparatus sends, actively according to a predetermine rule, the initial message including the serial number corresponding to said MLPE apparatus and the accumulated operation duration of said MLPE apparatus. The MLPE apparatuses determine the rank of the accumulated operation duration of each MLPE apparatus according to the initial messages sent from all MLPE apparatuses. After each MLPE apparatus communicates with the communication host of the photovoltaic system, the MLPE apparatuses reports the rank of the accumulated operation duration of each MLPE apparatus to the communication host. Thereby, the communication host determines the physical location of each device in the photovoltaic string according to the ranks of the accumulated operation durations and a sequence of installing positions of the devices in the photovoltaic string. With the method according to embodiments of the present disclosure, it is not necessary to paste label codes on the MLPE apparatuses, or record serial numbers of the MLPE apparatuses by installation personnel. Operation processes are simplified, operation time is saved, and labor costs are reduced.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION OF EMBODIMENTS

Hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

Herein the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

A method for ranking MLPE apparatuses is provided according to an embodiment of the present disclosure. Addressed are problems of long operation time, complex processes, and high labor costs in determining a physical position of each MLPE apparatus in conventional technology.

Figure 1:
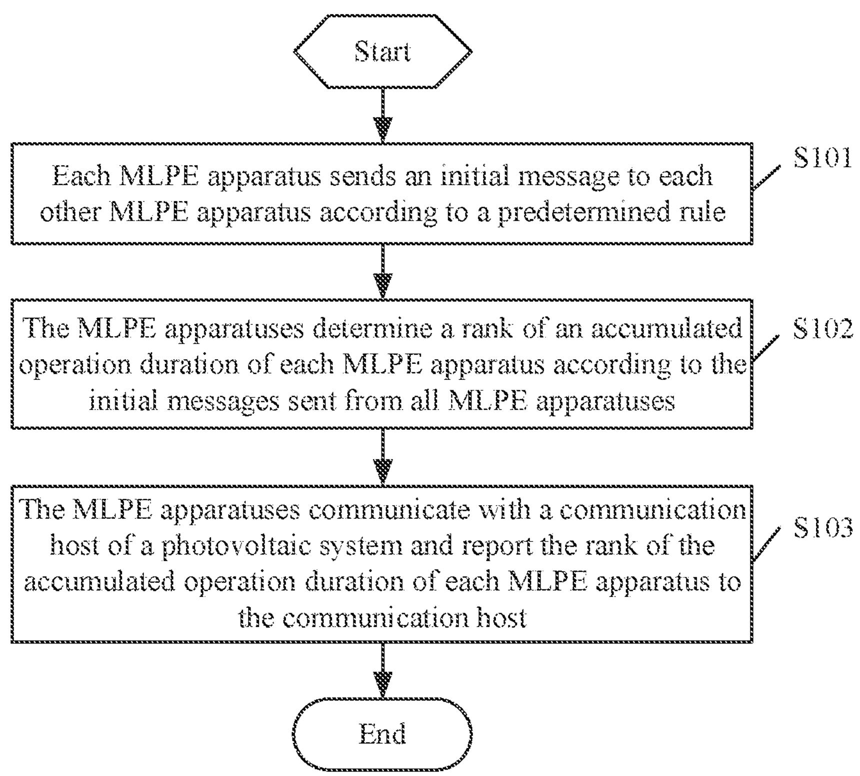
FIG. 1 is a flowchart of a method for ranking MLPE apparatuses according to an embodiment of the present disclosure.

The method for ranking MLPE apparatuses is applied to MLPE apparatuses that are that are in communication connection with each other in a photovoltaic system. A specific manner of the communication connection is not limited herein. A flowchart of the method may be as shown in FIG. 1. The method includes steps S101 to S103.

In step S101, each MLPE apparatus sends an initial message according to a predetermined rule. The initial message includes a serial number corresponding to said MLPE apparatus and an accumulated operation duration of said MLPE apparatus.

In practice, each MLPE apparatus corresponds to a serial number, that is, an ID number. The ID number may be marked on the MLPE apparatus before delivery, or may be dynamically allocated on site during installation. In a photovoltaic string, each MLPE apparatus corresponds to a unique ID number.

An internal program of each MLPE apparatus may record the accumulated operation duration of the MLPE apparatus. Longer accumulated operation duration indicates earlier installation of the MLPE apparatus.

The MLPE apparatuses are in communication connection each other, and therefore each MLPE apparatus is capable to send the initial message thereof to the other MLPE apparatuses. In practice, each MLPE apparatus sends the corresponding initial message according to a predetermined rule, in order to avoid a signal conflict among the MLPE apparatuses. The predetermined rule may depend on a specific application environment.

In step S102, the MLPE apparatuses determine a rank of the accumulated operation duration of each MLPE apparatus according to the initial messages sent from all MLPE apparatuses.

The initial message may further include an interim rank of the accumulated operation duration of the corresponding MLPE apparatus, besides the serial number and the accumulated operation duration.

An initial value of the interim rank of the accumulated operation duration in the initial message sent by each MLPE apparatus may be set as 1 (that is, the first rank) by default. For example, the accumulated operation duration of an MLPE apparatus 1 with an ID number A202007030001 is 62'33", and the interim rank of the accumulated operation duration of the MLPE apparatus 1 is equal to 1. In such case, the initial message sent from the MLPE apparatus 1 to the other MLPE apparatuses may be "A202007030001, 62'33", 1"

The initial message sent from any other MLPE apparatus is called a ranking message. In response to receiving the ranking message, each MLPE apparatus compares the accumulated operation duration included in the ranking message with the accumulated operation duration of said MLPE apparatus to obtain a first comparing result, and determines whether to adjust the interim rank of the accumulated operation duration of said MLPE apparatus based on the first comparing result, so as to determine the rank of the accumulated operation duration of the MLPE apparatus.

Figure 2:
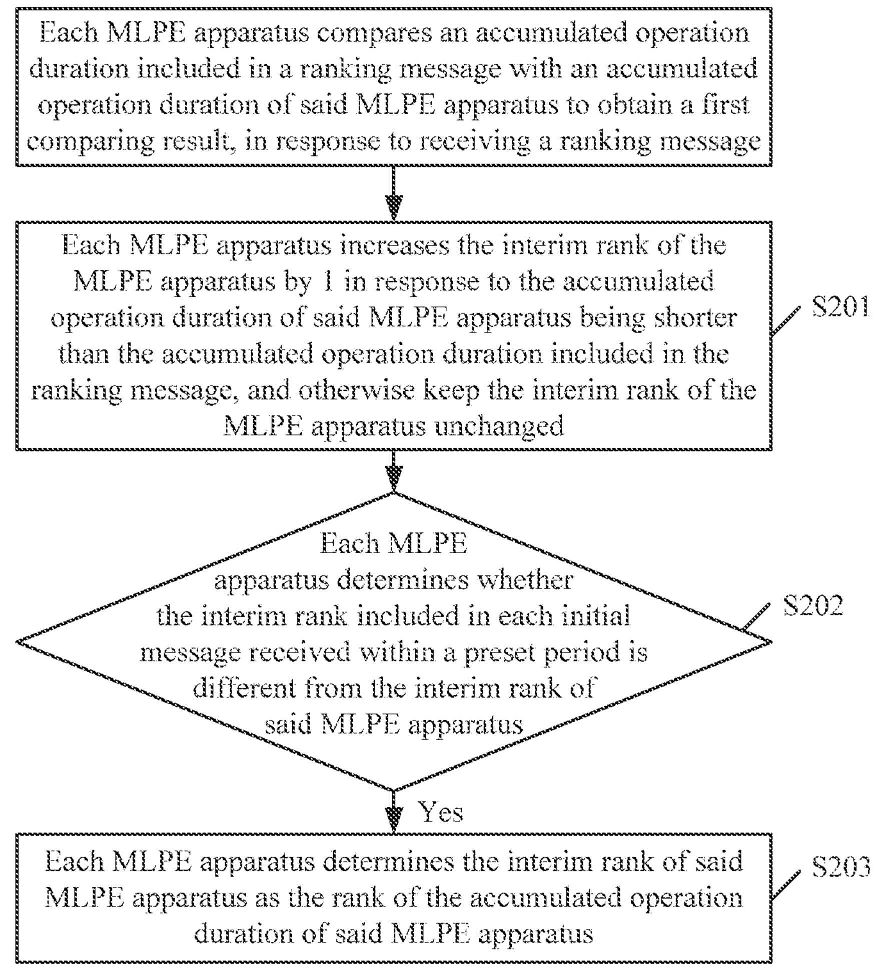
FIG. 2 is a flowchart of a method for each MLPE apparatus determining a rank of an accumulated operation duration rank thereof according to an embodiment of the present disclosure.

In such case, a process of determining whether to adjust the interim rank of the accumulated operation duration of said MLPE apparatus based on the first comparing result, to determine the rank of the accumulated operation duration of the MLPE apparatus, may be as shown in FIG. 2. In response to ranking message including the interim rank identical to that of the accumulated operation duration of the receiving MLPE apparatus, and the process includes steps S201 to S203.

In step S201, each MLPE apparatus increases the interim rank of said MLPE apparatus by 1, in response to the accumulated operation duration of said MLPE apparatus being shorter than the accumulated operation duration included in the ranking message. Otherwise, the interim rank of the MLPE apparatus is kept unchanged.

An example is illustrated as follows. The accumulated operation duration of an MLPE apparatus 1 is 10 minutes, and the interim rank of the MLPE apparatus 1 is 1. The interim rank of the MLPE apparatus 2 is also 1. In a case that the accumulated operation duration of an MLPE apparatus 2 is 15 minutes, the interim rank of the MLPE apparatus 1 is remained to be 1, in response to the MLPE apparatus 1 receiving the ranking message from the MLPE apparatus 2. In a case that the accumulated operation duration of the MLPE apparatus 2 is 5 minutes, the interim rank of the MLPE apparatus 1 is changed to be 2, in response to the MLPE apparatus 1 receiving the ranking message from the MLPE apparatus 2.

In step S202, each MLPE apparatus determines whether the interim rank included in each initial message received within a preset period is different from the interim rank of said MLPE apparatus. The process goes to step 203 in response to positive determination.

The predetermined period may be manually set based on a practical requirement. For example, the predetermined period is set to be 10 minutes.

In step S203, each MLPE apparatus determines the interim rank of said MLPE apparatus as the rank of the accumulated operation duration of said MLPE apparatus.

The flow as shown in FIG. 2 may terminate when the interim ranks of all MLPE apparatuses in a photovoltaic system or in a photovoltaic string are different from each other. For example, the ranking process terminates in response to the interim rank included in each initial message received by an MLPE apparatus within a preset period is different from the interim rank of such MLPE apparatus. Otherwise, the MLPE apparatuses continue to send the initial messages, to dynamically adjust the ranks of the accumulated operation durations the MLPE apparatuses in the photovoltaic system.

Figures 3, 4:
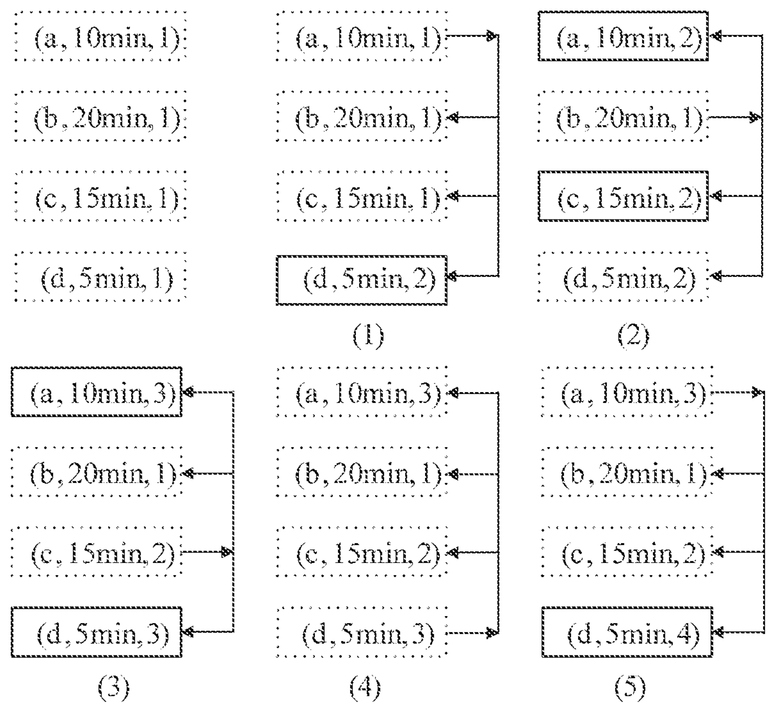
FIG. 3 is a schematic diagram of a process of each MLPE apparatus determining a rank of an accumulated operation duration rank thereof according to an embodiment of the present disclosure.
FIG. 4 is a schematic diagram of a correspondence between ranked accumulated operation durations of MLPE apparatuses and a sequence of installing positions of photovoltaic modules according to an embodiment of the present disclosure.
Figure 5:
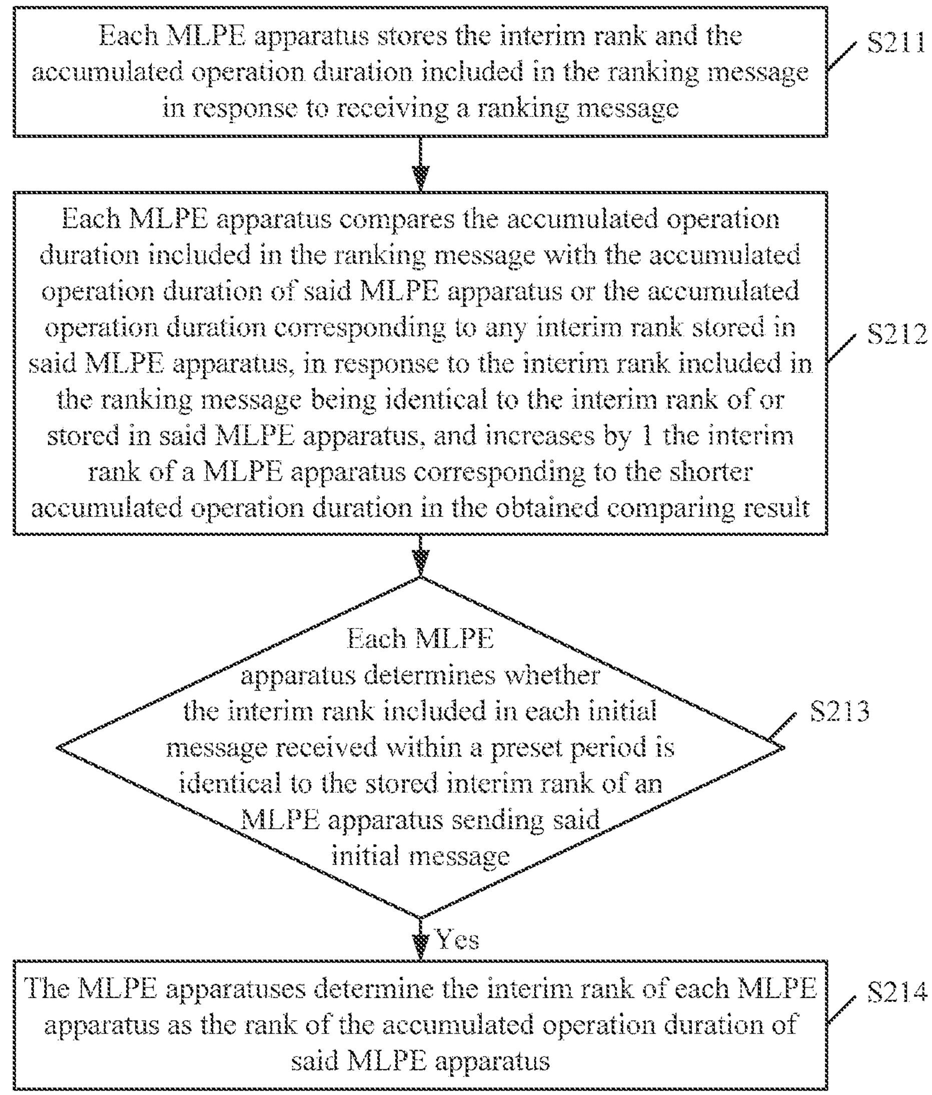
FIG. 5 is a flowchart of a method for each MLPE apparatus determining a rank of an accumulated operation duration rank thereof according to another embodiment of the present disclosure.

An exemplary process of ranking is as shown in FIG. 3. It is assumed that a photovoltaic string includes four MLPE apparatuses, and the four MLPE apparatuses report the initial messages successively. In FIG. 3, each initial message is sent from an apparatus at a tail of an arrow to apparatuses at heads of the arrow. A solid box frame indicates that the interim rank of a corresponding MLPE apparatus is modified after the MLPE apparatus receives the initial message. A dashed box frame indicates that the interim rank of a corresponding MLPE apparatus is unchanged after the MLPE apparatus receives the initial message. In FIG. 3, the rank of the accumulated operation duration of each MLPE apparatus is determined in step (5). Afterwards, the method goes to step S103.

In step S103, the MLPE apparatuses communicate with a communication host of the photovoltaic system, and report the rank of the accumulated operation duration of each MLPE apparatus to the communication host.

In practice, the MLPE apparatuses and the communication host may be installed in different days. For example, installation personnel install all MLPE apparatuses and all photovoltaic modules in the first day, and install the communication host in the second day. The MLPE apparatuses would be powered down at random moments in the first night, and acquire power again at random moments in the second day. Thereby, timing of the accumulated operation durations is influenced, and a result of the ranking obtained when establishing the network in the second day is inaccurate. According to embodiments of the present disclosure, the rank of the accumulated operation duration of each MLPE apparatus is determined before the MLPE apparatus communicates with the communication host of the photovoltaic system. That is, the rank of the accumulated operation duration ranks of each MLPE apparatus is determined in the first day after all the MLPE apparatuses have been installed, which can address the above issue.

The method for ranking MLPE apparatuses is provided according to embodiments of the present disclosure. Each MLPE apparatus sends, actively according to a predetermine rule, the initial message including the serial number corresponding to said MLPE apparatus and the accumulated operation duration of said MLPE apparatus. The MLPE apparatuses determine the rank of the accumulated operation duration of each MLPE apparatus according to the initial messages sent from all MLPE apparatuses. After each MLPE apparatus communicates with the communication host of the photovoltaic system, the MLPE apparatuses reports the rank of the accumulated operation duration of each MLPE apparatus to the communication host. Thereby, the communication host determines the physical location of each device in the photovoltaic string according to the ranks of the accumulated operation durations and a sequence of installing positions of the devices in the photovoltaic string. With the method according to embodiments of the present disclosure, it is not necessary to paste label codes on the MLPE apparatuses, or record serial numbers of the MLPE apparatuses by installation personnel. Operation processes are simplified, operation time is saved, and labor costs are reduced.

A method for ranking MLPE apparatuses is further provided according to another embodiment of the present disclosure. Referring to the aforementioned embodiments, the method includes steps S211 to S214.

In step S211, each MLPE apparatus stores the interim rank and the accumulated operation duration included in the ranking message in response to receiving a ranking message.

In step S212, each MLPE apparatus compares the accumulated operation duration included in the ranking message with the accumulated operation duration of said MLPE apparatus to obtain a first comparing result in response to the interim rank included in the ranking message being identical to the interim rank of the accumulated operation duration of said MLPE apparatus, and compares the accumulated operation duration included in the ranking message with the accumulated operation duration corresponding to any interim rank stored in said MLPE apparatus to obtain a second comparing result in response to the interim rank included in the ranking message being identical to said interim rank stored in said MLPE apparatus.

Further in the step S212, each MLPE apparatus increases, by 1, the interim rank of a MLPE apparatus corresponding to the shorter accumulated operation duration in the obtained first comparing result or the obtained second comparing result.

For example, the interim rank of the MLPE apparatus is increased by 1 in response to the accumulated operation duration of the MLPE apparatus being shorter than the accumulated operation duration included in the ranking message sent from another MLPE apparatus, and the interim rank of the MLPE apparatus is kept unchanged and the interim rank of another MLPE apparatus is increased by 1 in response to the accumulated operation duration of the MLPE apparatus being longer than the accumulated operation duration included in the ranking message sent from the other MLPE apparatus. For another example, the interim rank of a third MLPE apparatus, which is stored in the MLPE apparatus, is increased by 1 in response to the accumulated operation duration of the third MLPE apparatus being shorter than the accumulated operation duration included in the ranking message sent from another MLPE apparatus, and the interim rank of the third MLPE apparatus is kept unchanged and the interim rank of another MLPE apparatus is increased by 1 in response to the accumulated operation duration of the third MLPE apparatus being longer than the accumulated operation duration included in the ranking message sent from the other MLPE apparatus. The MLPE apparatus updates the stored interim ranks of other MLPE apparatuses through the process in the step S212.

Reference is further made to FIG. 2. After the step (5) is performed, the MLPE apparatuses does not know whether the ranking is completed, and therefore may continue to send the ranking messages for determining whether the ranking is completed. In this embodiment, each MLPE apparatus stores the interim ranks of another MLPE apparatus when receiving the ranking message from the other MLPE apparatus, updates the stored interim ranks of other MLPE apparatuses accordingly, and therefore is capable to know timely whether the rank is completed. Time consumed by the ranking is greatly reduced.

In step S213, each MLPE apparatus determines whether the interim rank included in each initial message received within a preset period is identical to the stored interim rank of an MLPE apparatus sending said initial message. The method goes to step S214 in case of positive determination.

Each time receiving the ranking message from another MLPE apparatus, the MLPE apparatus determines the interim rank thereof and updates the stored interim ranks of other MLPE apparatuses. Theoretically, correct ranks of the accumulated operation durations by an MLPE apparatus, when the interim ranks of all the other MLPE apparatuses are stored in such MLPE apparatus. In practice, the MLPE apparatus may not be capable to determine whether the interim ranks of all the other MLPE apparatuses are stored in it. Hence, when the interim rank included in each initial message received by a MLPE apparatus within a preset period is identical to the stored interim rank of an MLPE apparatus sending said initial message, it may indicate that the interim ranks of all the other MLPE apparatuses are stored in such MLPE apparatuses. For example, a photovoltaic string includes four MLPE apparatuses 1 to 4. In such case, when the interim ranks included in the initial messages sent from all MLPE apparatuses sent from the MLPE devices 2-4 to the MLPE apparatus 1 within 10 minutes are identical to respective interim rank of the MLPE devices 2-4 stored in the MLPE apparatus 1, the MLPE apparatuses 1 may determine that it has stored the interim ranks of all the other MLPE apparatuses.

In step S214, the MLPE apparatuses determine the interim rank of each MLPE apparatus as the rank of the accumulated operation duration of said MLPE apparatus.

Figure 6:
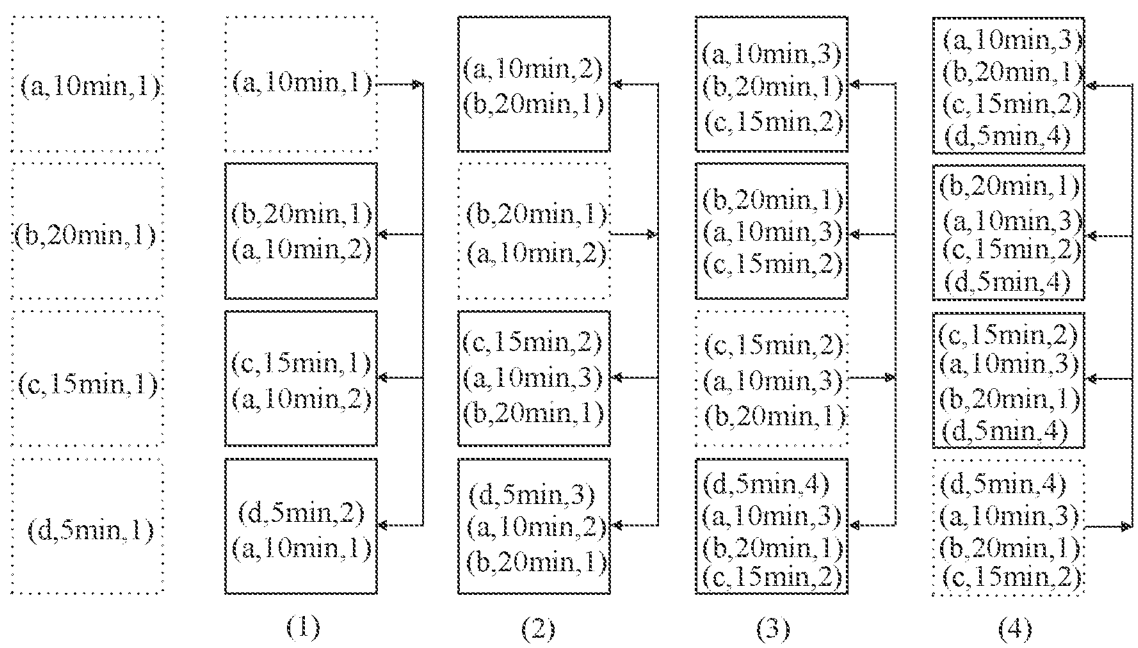
FIG. 6 is a schematic diagram of a process of each MLPE apparatus determining a rank of an accumulated operation duration rank thereof according to another embodiment of the present disclosure.

A process of ranking according to an embodiment may be as shown in FIG. 6, and the present disclosure is not limited thereto. In FIG. 3, each initial message is sent from an apparatus at a tail of an arrow to apparatuses at heads of the arrow. A solid box frame indicates that the interim rank of or stored in a corresponding MLPE apparatus is modified after the MLPE apparatus receives the initial message. A dashed box frame indicates that the interim rank of or stored in a corresponding MLPE apparatus is unchanged. As shown in FIG. 6, the four MLPE apparatuses send ranking messages successively, the interim ranks stored in each MLPE apparatus is updated, and correct ranks are acquired in step (3), namely, acquired two steps ahead of the case as shown in FIG. 2. More steps can be saved in a case that the photovoltaic string includes more than four MLPE apparatuses. In this embodiment, a sequence of the MLPE apparatuses is acquired before the MLPE apparatuses communicate with the communication host. Thereby, a network of a photovoltaic system is established only partially based on the communication host, which reduces time consumed in establishing the network.

Step (4) is further performed after the correct ranks are acquired in process as shown in FIG. 6, so that each MLPE apparatus in the photovoltaic system stores the interim ranks of all MLPE apparatuses. It is prevented that some MLPE apparatuses may not be accessed due to poor network quality when establishing the network. At this time, the communication host may acquire the sequence of the interim ranks of all MLPE apparatuses in the photovoltaic system when communicating with any MLPE apparatus. It is not necessary to perform another process of sequencing at the communication host, which improves recognition rate and success rate when establishing the network.

Other principles may refer to the description of the aforementioned embodiments, and are not repeated herein.

Figure 7:
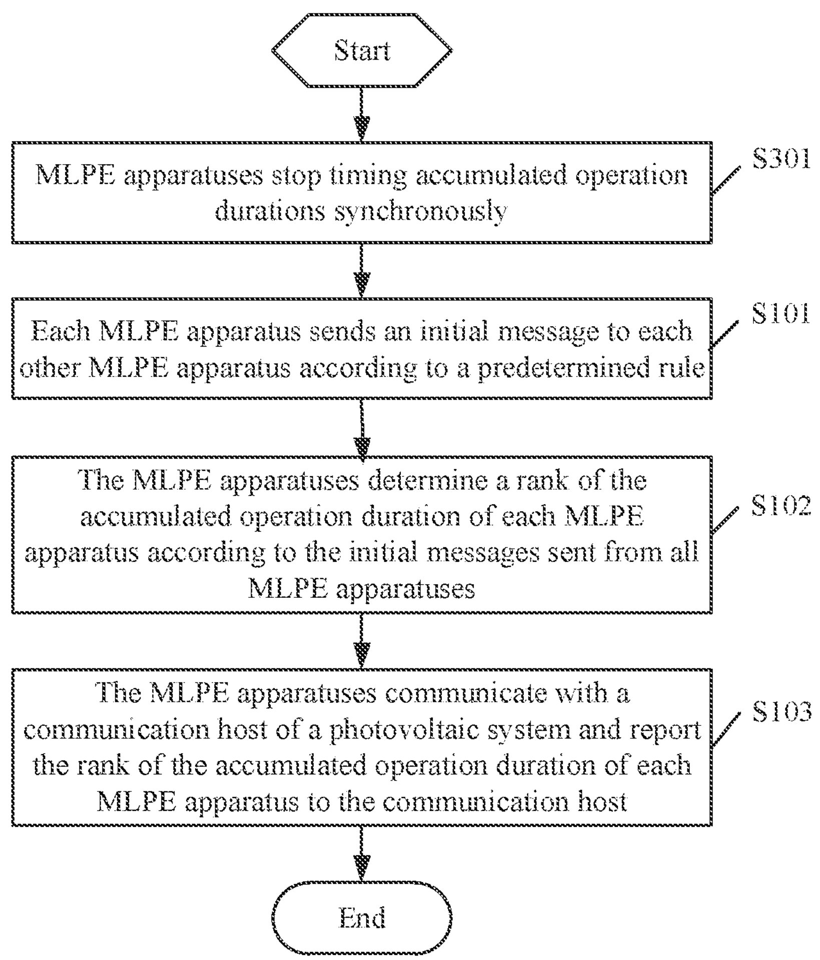
FIG. 7 is a flowchart of a method for ranking MLPE apparatuses according to another embodiment of the present disclosure.

A method for ranking MLPE apparatuses is further provided according to another embodiment of the present. A flowchart of the method is as shown in FIG. 7. Before each MLPE apparatus sends the initial message among the MLPE apparatus according to the predetermined rule, the method further includes step S301.

In step S301, the MLPE apparatuses stop timing the accumulated operation durations synchronously.

The MLPE apparatuses are installed at different times, that is, the MLPE apparatuses start timing at different moments. After all MLPE apparatuses are installed, the MLPE apparatuses are controlled to stop timing the accumulated operation durations synchronously. Therefore, the accumulated operation durations included in the initial messages sent by each MLPE apparatus are different from each other, and the rank of each MLPE device can be determined according to the aforementioned manner of self-networking.

The MLPE apparatuses may stop timing the accumulated operation durations synchronously in response to detecting a timing-stop signal. The timing-stop signal may be at least one of: a change in an output voltage, a change in an output current, a short-circuit connection, or a preset communication signal.

The timing-stop signal may be generated by a converter, a switch device, a synchronization device, the communication host, or a power grid, which is in a post-stage of the MLPE apparatuses of the photovoltaic system. Hereinafter the synchronization device is taken as an example, and controlling the MLPE apparatuses to stop timing the accumulated operation durations synchronously may include a following process.

Installation personnel connect the synchronization device to the photovoltaic string, after determining that all the MLPE apparatuses have been installed. The additional synchronization device applies a voltage or a current on the photovoltaic string, or transmits a triggering signal to the MLPE apparatuses, so as to trigger the MLPE apparatuses to stop timing the accumulated operation durations synchronously.

The synchronization device may be add-on equipment, which is only used in installing and debugging the system, and is removed after the system is installed and debugged.

In a case that the photovoltaic string or a converter in a post-stage of the MLPE apparatuses is connected to a power grid, the power grid may induce a change in voltage, current, frequency, or the like of the photovoltaic string. Further, in a case that the converter is connected to the power grid and starts operating, the power grid may induce a change of voltage, current, frequency, or the like of the photovoltaic string. Therefore, the timing-stop signal may also be generated due to connection with the power grid.

In a case that the timing-stop signal is the short-circuit connection, the timing-stop signal may be generated in one of following manners.

(1) The timing-stop signal is generated by shorting a converter in a post-stage of the MLPE apparatuses. For example, the converter in the post-stage of the MLPE apparatuses is a boost circuit, and a switch transistor in the boost circuit is turned on to short outputs of the photovoltaic string.

(2) The timing-stop signal is generated by shorting a switch device. For example, a switch device is installed between two cables of the photovoltaic string, and the switch device is switched on to short the photovoltaic string.

(3) The timing-stop signal is generated by shorting the photovoltaic string manually. For example, a male terminal and a female terminal on two cables of the photovoltaic string are coupled to form the short-circuit connection.

As an example, it is assumed that each MLPE apparatus outputs a preset voltage to a converter after being installed, for example, outputs a safe voltage around 1V. An output voltage of a photovoltaic string including 12 MLPE apparatuses connected in series is around 12V.

After receiving an input voltage around 12V, the converter transmits a prompt signal to the communication host, so as to inform the operator that the photovoltaic string has been installed.

After all MLPE apparatuses are installed, the converter or the switch device is shorted through software control, or the photovoltaic string is manually shorted by the operator, which may reduce the output voltage of the photovoltaic string to zero. The MLPE apparatuses stop timing the accumulated operation durations synchronously in response to detecting the short-circuit connection. In case of two photovoltaic strings, the two photovoltaic strings may be connected in an end-to-end manner, to form a large short-circuit loop. In such case, the accumulated operation durations of all MLPE apparatuses in the two photovoltaic strings may be ranked together.

Described above are only exemplary manners of triggering the MLPE apparatuses to stop timing the accumulated operation durations synchronously. The present disclosure is not limited thereto. Other manners of triggering the MLPE apparatuses to stop timing the accumulated operation durations synchronously also fall within the protection scope of the present disclosure.

There may be some special cases in practical application scenarios. For example, installation personnel only install a part of photovoltaic strings in one day, and time is insufficient for installing the remaining photovoltaic modules and MLPE apparatuses. In such case, the installed MLPE apparatuses of the photovoltaic string may be triggered to stop timing the accumulated operation durations synchronously, so as to prevent random nocturnal power-down from affecting the timing. Each installed MLPE apparatus records the accumulated operation duration thereof in such day. In a next day, the timing may be resumed by triggering the installed MLPE apparatuses to start timing again, before installing the remaining photovoltaic modules and MLPE apparatuses. That is, after the MLPE apparatuses stop timing the accumulated operation durations synchronously in step S301, the method may further includes followings two steps. The MLPE apparatuses determine whether a timing-start signal is detected. The MLPE apparatuses resume timing the accumulated operation durations in response to determining that the timing-start signal is detected. Finally, all the MLPE apparatuses in the photovoltaic string stop timing the accumulated operation durations synchronously, and each MLPE apparatus in the photovoltaic string acquires the accumulated operation durations thereof.

Other principles may refer to description of the aforementioned embodiments, and are not repeated herein.

After the MLPE apparatuses stop timing the accumulated operation durations synchronously, the MLPE apparatuses send the initial messages according to a predetermined rule, in order to avoid a signal conflict among the MLPE apparatuses when sending the initial messages. The predetermined rule may be determined in following manners.

In a first manner, each MLPE apparatus sends the initial message in response to a random period lapsing after stopping timing the respective accumulated operation duration. The MLPE apparatuses may correspond to the random periods different from each other. There may be a small quantity of MLPE apparatuses correspond to identical random periods, which would not result in a severe signal conflict.

In a second manner, each MLPE apparatus sends the initial message in response to a corresponding preset period lapsing after stopping timing the respective accumulated operation duration. The preset period may be acquired based on the accumulated operation duration of the MLPE apparatus. For example, a value of the predetermined period may be in correlation (positive correlation or negative correlation) with the accumulated operation duration of the corresponding MLPE apparatus. As an example, each MLPE apparatus may sends the initial message in response to a period of T lapsing after the timing being stopped. T may be determined on requirement, for example, equal to the accumulated operation duration divided by 3600. In such case, assuming that the accumulated operation durations of the MLPE apparatuses #1 and #2 are 62'33" and 57'15", respectively, the moments at which the MLPE apparatuses #1 and #2 send the initial message are 62'33"/3600=1.0425" and 57'15"/3600=0.9542, respectively, from the timing being stopped. Other cases can be obtained by analogy. The MLPE apparatuses send the initial message at different moments, since the respective accumulated operation durations of the MLPE apparatuses are different from each other. Alternatively, a value of the preset period may be in correlation with a serial number of the corresponding MLPE apparatus. For example, the serial number (or part of the serial number) of the MLPE apparatus is converted through calculation into a moment at which the MLPE apparatus sends the initial message. The calculated moments for sending the initial messages are different for different MLPE apparatuses, since the serial numbers of the MLPE apparatuses are different from each other.

In a third manner, in response to one of the MLPE apparatuses sending the initial message, each remaining MLPE apparatus determines a respective sending time based on a difference in the respective accumulated operation duration between the one of the MLPE apparatuses and said remaining MLPE apparatus. In one embodiment, after any of the MLPE apparatuses sends the initial message first, each of the remaining MLPE apparatuses receives and parses the accumulated operation duration included in the received initial message to acquire a difference in the accumulated operation duration between itself and the MLPE apparatus sending the initial message first. Then, a sending time of such remaining MLPE apparatus is determined based on such difference. For example, after an MLPE apparatus #1 sends the initial message, an MLPE apparatus #2 calculates a difference between the accumulated operation duration of the MLPE apparatus #2 and the accumulated operation duration of the MLPE apparatus #1, where the difference is equal to 7'24". Accordingly, the MLPE apparatus #2 may send the initial message after waiting for 7'24"/360=1.233".

The above three manners are only part of examples, and the present disclosure is not limited thereto. Any predetermined rule which can avoid the signal conflict among the MLPE apparatuses when sending the initial message falls within the protection scope of the present disclosure.

Other principles may refer to the description of the aforementioned embodiments, and are not repeated herein.

Figure 8:
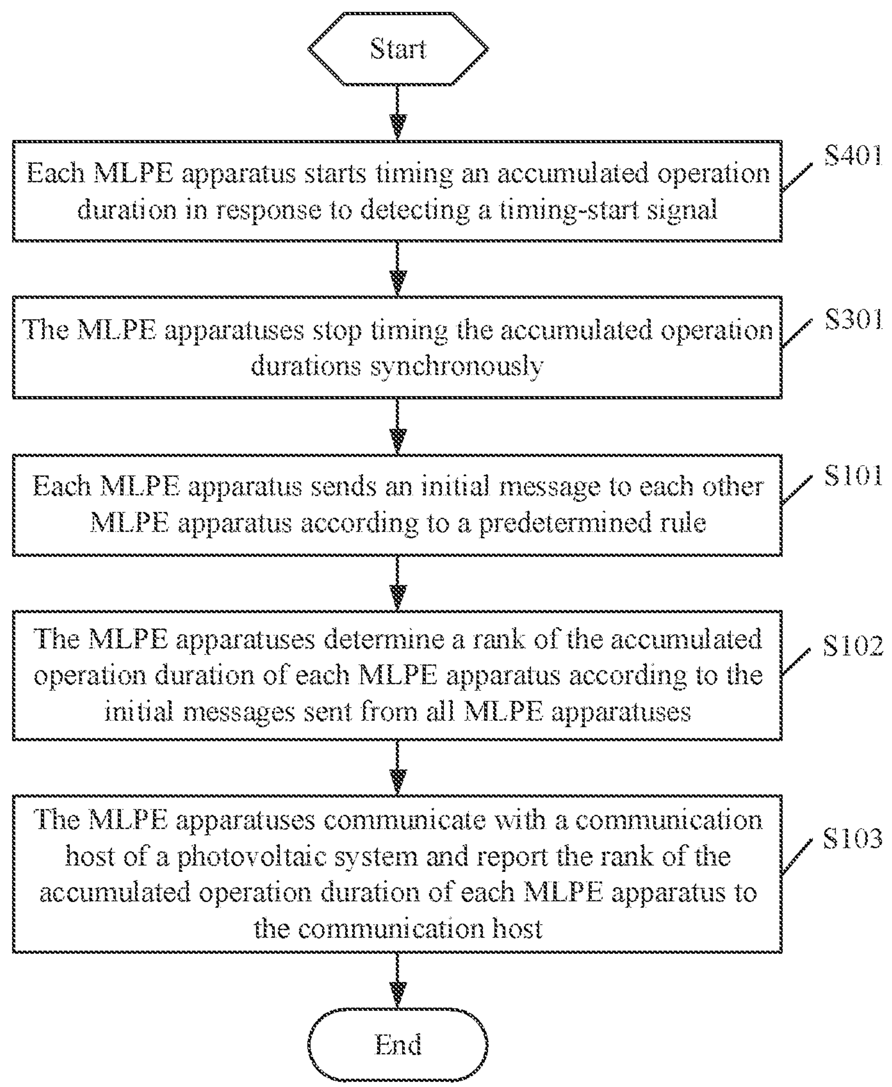
FIG. 8 is a flowchart of a method for ranking MLPE apparatuses according to another embodiment of the present disclosure.

A method for ranking MLPE apparatuses is further provided according to another embodiment of the present disclosure. A flowchart of the method is as shown in FIG. 8. On a basis of the aforementioned embodiments, before each MLPE apparatus sends the initial message to each other MLPE apparatus according to the predetermined rule (the step S101), the method further includes step S401.

In step S401, each MLPE apparatus starts timing the accumulated operation duration in response to detecting a timing-start signal.

In the aforementioned embodiments, it may be set by default that each MLPE apparatus of the photovoltaic string starts timing immediately in response to being powered on, and each MLPE apparatus may acquire the accumulated operation duration thereof as long as the MLPE apparatuses stop timing synchronously. In some scenarios, various factors may result in inaccuracy in the acquired accumulated operation durations, when the MLPE apparatuses are only controlled to stop timing synchronously. For example, the MLPE apparatus may be pre-installed in the photovoltaic module before delivery, or the MLPE apparatus may be integrated in a junction box of the photovoltaic module. In such cases, the MLPE apparatus may be powered in response to being exposed to light, even before the photovoltaic module is transported to the installing position and installed.

In view of the above, the step S401 is performed before the step S101 in this embodiment. That is, each MLPE starts timing the accumulated operation duration when detecting the corresponding timing-start signal, and then the step S201 is performed, so as to acquire the accumulated operation durations of the MLPE apparatuses.

The timing-start signal is detectable by each MLPE apparatus during installation. In a photovoltaic system or a photovoltaic string, the MLPE apparatuses are installed at different moments. Each MLPE apparatus may be triggered to start timing the accumulated operation duration in response to detecting the timing-start signal at the moment of installation. Thereby, the MLPE apparatuses start timing at different moments.

Each MLPE apparatus detects the timing-start signal by at least one of: detecting a predetermined electric change, being subject to a predetermined mechanical change, or receiving a preset signal through communication.

The predetermined electric change may be being powered. For example, in a new photovoltaic system, the photovoltaic modules are usually installed on site together with the MLPE apparatuses. The MLPE apparatus is first fixed on a frame or a support of the photovoltaic module, and an input terminal of the MLPE apparatus is connected to the photovoltaic module. Therefore, the earlier an MLPE apparatus is installed, the earlier such MLPE apparatus is connected to a photovoltaic module, and the earlier such MLPE apparatus is powered and starts timing the accumulated operation duration. Different MLPE apparatuses are installed at different moments, and thereby record different accumulated operation durations.

A case of a reconstructed photovoltaic system is similar to the one of the new photovoltaic system. Photovoltaic modules have been installed in the reconstructed system. When adding MLPE apparatuses into the system, the earlier such MLPE apparatus is connected to a photovoltaic module, the earlier such MLPE apparatus is powered and starts timing the accumulated operation duration. Different MLPE apparatuses are installed at different moments, and thereby record different accumulated operation durations.

Alternatively, the predetermined electric change may be a change of an electric parameter at an input terminal or an output terminal. The electric parameter includes a voltage, a current, a frequency, or the like. For example, when a MLPE apparatus detects that an input voltage is greater than 20V, it is indicated that the MLPE apparatus has been installed on a photovoltaic module, and thereby the MLPE apparatus may start timing. For another example, when a MLPE apparatus detects that an output voltage is equal to 1V, it is indicated that the MLPE apparatus has been powered and in an initial state, and thereby the MLPE apparatus may start timing. Additionally or alternatively, an additional device may be configured to detect the change of the electric parameter at the input terminal or an output terminal of an MLPE apparatus may be detected, in order to trigger the MLPE apparatus to start timing. For example, an output terminal of the MLPE apparatus is provided with a voltage generator, and the voltage generator is configured to generate a voltage following a predetermined rule, so that the MLPE apparatus is capable to detect the voltage accurately.

In the case that the MLPE apparatus is pre-installed in the photovoltaic module before delivery or integrated in a junction box of the photovoltaic module, the MLPE apparatus may be powered in response to being exposed to light, even before the photovoltaic module is transported to the installing position and installed. Hence, the above manner of triggering timing based on the electric change, such as being powered, may not be applicable. In view of the above, the timing-start signal may be detected in response to the MLPE apparatus being subject to a predetermined mechanical change.

In practice, the predetermined mechanical change may be: a predetermined component being installed or removed, a predetermined component being connected or disconnected, or a state of a predetermined component being changed.

Examples of removing the predetermined component from the MLPE apparatus may be as follows. A plug configured to connect and disconnect two nodes in the MLPE apparatus is pre-installed in the MLPE apparatus before delivery. During installing the MLPE apparatus or the photovoltaic module in which the MLPE apparatus is pre-installed or integrated, the plug is temporarily or permanently removed to establish or break connection between the two nodes. The MLPE apparatus is triggered to start timing in response to detecting the connection between the two nodes being established or broken. Alternatively, the predetermined component may operate based on electromagnetic induction, for example, may be a magnetic strip or a component provided with a near field communication (NFC) chip. In response to the component being removed temporarily or permanently, the MLPE apparatus detects an internal change of a magnetic field or a communication signal, and the timing is triggered to start.

Examples of installing the predetermined component to the MLPE apparatus may be as follows. For example, a socket is reserved in the MLPE apparatus before delivery. During installing the MLPE apparatus or the photovoltaic module in which the MLPE apparatus is pre-installed or integrated, the timing is triggered to start in response to the component being inserted into the socket. The component may be provided in a package of the MLPE apparatus, or may be a conventional tool for on-site installation, such as a screwdriver. The component may be permanently removed or installed, in order to trigger the MLPE apparatus to start timing. Alternatively, the component may be temporarily removed or inserted once. For example, the screwdriver is inserted to the socket once and then pulled out immediately, to trigger the MLPE apparatus to start timing. Alternatively, the predetermined component may operate based on electromagnetic induction, for example, may be a magnetic strip or a component provided with a NFC chip. In response to the component being installed temporarily or permanently, the MLPE apparatus detects an internal change of a magnetic field or a communication signal, and the timing is triggered to start. The above components installed in or removed from the MLPE apparatus are only part of examples, and the present disclosure is not limited thereto.

An example of connecting the predetermined component of the MLPE apparatus may be as follows. Two output terminals of the MLPE apparatus or the photovoltaic module in which the MLPE apparatus is pre-installed or integrated are in a floating state when delivery. During installation, the two output terminals are transiently coupled with each other, which is detected by the MLPE apparatus, and thereby timing is triggered to start.

An example of disconnecting the predetermined component of the MLPE apparatus may be as follows. Two output terminals of the MLPE apparatus or the photovoltaic module in which the MLPE apparatus is pre-installed or integrated are shorted when delivery. During installation, the two output terminals disconnected from each other, which is detected by the MLPE apparatus, and thereby timing is triggered to start.

An example of a state of the predetermined component of the MLPE apparatus being changed may be as follows. A button, a knob, or a dial switch is reserved on an MLPE apparatus. During installation, a state of the button, the knob, or the dial switch is changed to trigger the MLPE apparatus to start timing.

Alternatively, each MLPE apparatus may detect the timing-start signal in response to receiving a preset signal indicating starting the timing, which is transmitted through communication. In practice, the preset signal may be transmitted from an external device. That is, each MLPE apparatus is triggered to start timing by an external communication signal. For example, the communication signal is generated by a portable device, such as a mobile phone or a smart wearable device with a communication function (for example, a smart bracelet, smart glasses, or a smart ring). The communication signal is transmitted to the MLPE apparatus to trigger the timing, by using a protocol suitable for communication over a short distance, such as the NFC or the Bluetooth, in response to the mobile phone or the smart wearable device with a communication function approaching the MLPE apparatus. The protocol suitable for communication over the short distance is advantageous in that triggering timing of one MLPE apparatus would not lead to erroneously triggering timing of another located nearby.

The aforementioned communication signal may further be configured as a signal for activating the MLPE apparatus. The MLPE apparatus may output a safe voltage before being activated, and may output normal power after being activated.

Other principles may refer to the description of the aforementioned embodiments, and are not repeated herein.

Figure 9:
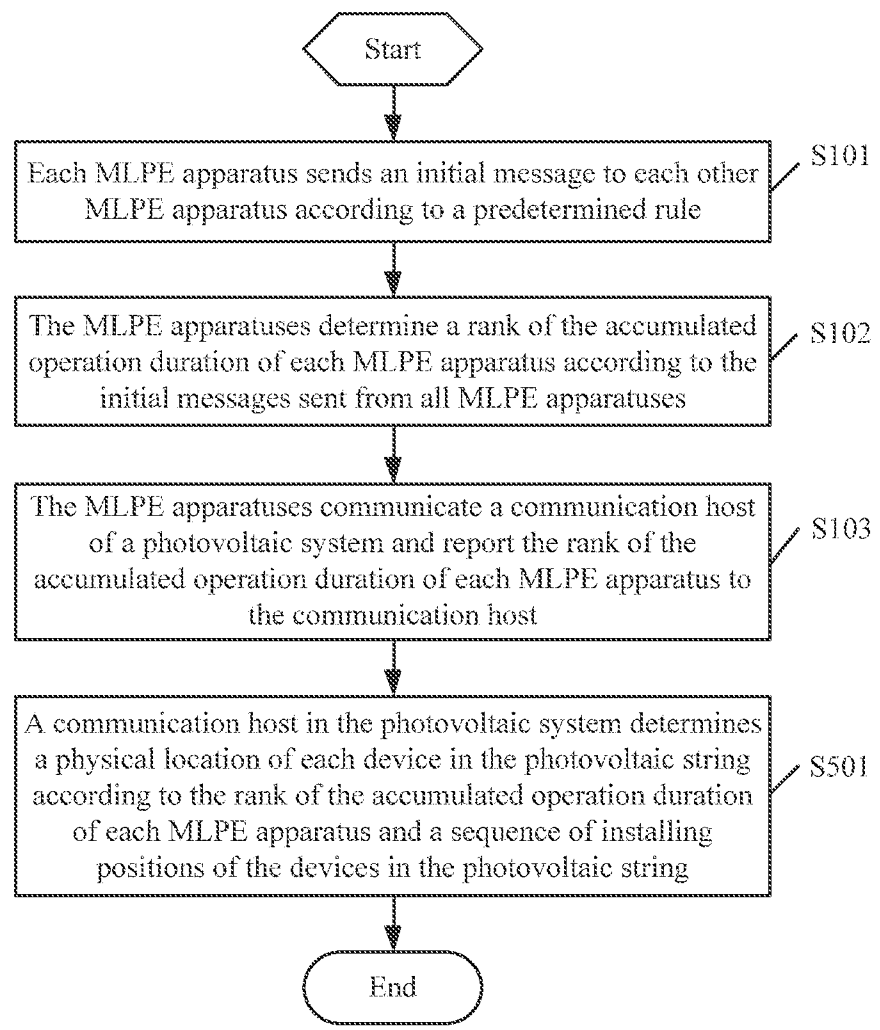
FIG. 9 is a flowchart of a method for locating devices in a photovoltaic string according to an embodiment of the present disclosure.

A method for locating devices in a photovoltaic string is further provided according to an embodiment of the present disclosure. On a basis of the aforementioned embodiments, step S501 is performed after the MLPE apparatuses communicate with the communication host and report the accumulated operation duration ranks of the MLPE apparatuses to the communication host. A flowchart of the method is as shown in FIG. 9.

In step S501, a communication host in the photovoltaic system determines a physical location of each device in the photovoltaic string according to the rank of the accumulated operation duration of each MLPE apparatus and a sequence of installing positions of the devices in the photovoltaic string. The devices are installed at the installing positions based on the sequence.

The devices in the photovoltaic string include photovoltaic modules, or the MLPE apparatuses in a post-stage of photovoltaic modules. There is a correspondence between a sequence of ranks of the accumulated operation durations of the MLPE apparatuses and a sequence of the installing positions of the MLPE apparatuses (or the photovoltaic modules corresponding to the MLPE apparatuses, respectively). Therefore, the physical location of each device in the photovoltaic string can be determined by sequencing the ranked accumulated operation durations and mapping the sequenced accumulated operation durations to the installation positions of the MLPE apparatuses.

Technical personnel may establish a model of a photovoltaic system using software in a communication host provided with a display interface (for example, a handheld tablet computer, a mobile phone, or a computer, on which a corresponding APP or a corresponding Web interface is provided). As shown in FIG. 4, the photovoltaic system may include a photovoltaic string, and the photovoltaic string may include twelve photovoltaic modules sequentially installed at installation positions #1, #2 . . . #12. The twelve photovoltaic modules correspond to twelve MLPE apparatuses, 1 to 12, respectively. It is assumed that the photovoltaic modules are installed successively following a direction of an arrow line as shown in FIG. 4, that is, the photovoltaic modules and the corresponding MLPE apparatuses are installed at the installation position #1 first, and installed at the installation position #12 last. In such case, the MLPE apparatuses can be mapped to the installation positions according to the ranks of the accumulation operation durations and the sequence of the installation positions, and accordingly the physical location of each MLPE apparatus or each photovoltaic module can be determined. The sequence of the installation positions as shown in FIG. 4 is only exemplary, and the present disclosure is not limited thereto. Those skilled in the art may design another sequence of the installation positions according to actual conditions, which also falls within the protection scope of the present disclosure.

Other principles may refer to description of the aforementioned embodiments, and are not repeated herein.

Figure 10:
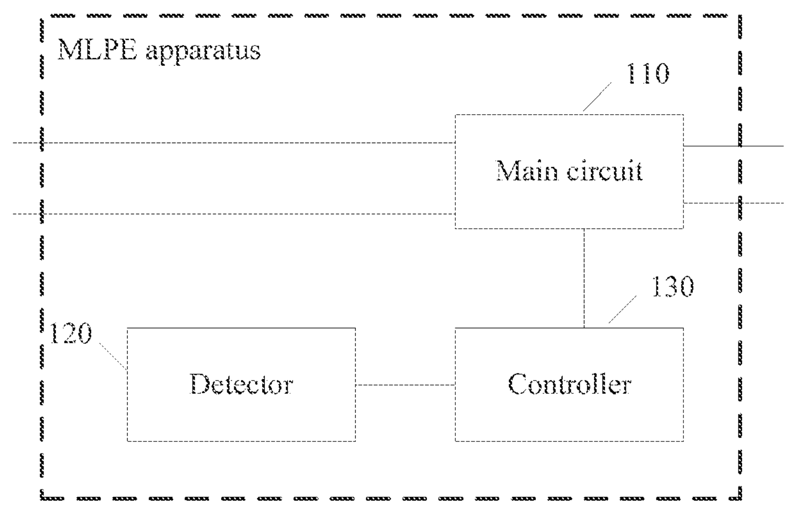
FIG. 10 is a schematic structural diagram of an MLPE apparatus according to an embodiment of the present disclosure.

An MLPE apparatus is further provided according to another embodiment of the present disclosure. A schematic structural diagram of the MLPE apparatus may be as shown in FIG. 10. The MLPE apparatus includes a main circuit 110, a detector 120, and a controller 130.

The detector 120 is configured to detect a signal, such as the timing-stop signal. An input of the main circuit 110 receives power from a photovoltaic module in a photovoltaic system. An output of the main circuit 110 is connected to an output of a main circuit 110 of another MLPE apparatus in parallel or in series, to form a photovoltaic string in the photovoltaic system.

The controller 130 is coupled to the main circuit 110 and the detector 120, and is in communication connection with each other MLPE apparatus in the photovoltaic string. The controller 130 is configured to perform any aforementioned method for ranking the MLPE apparatuses.

The controller 130 includes the built-in predetermined rule for sending the initial message of the MLPE apparatus. Each initial message includes the serial number and the accumulated operation duration, and may include the interim rank of the accumulated operation duration when required. The controller 130 is configured to control an operation state of the main circuit 110, determine the rank of the accumulated operation duration of the MLPE apparatus according to the initial messages sent from all MLPE apparatuses, and report the rank of the accumulated operation duration of the MLPE apparatus to the communication host after the MLPE apparatus communicates with the communication host. Accordingly, the communication host may determine the physical location of each device in the photovoltaic string, according to the rank of the accumulated operation duration of each MLPE apparatus and the sequence of the installing positions of the devices in the photovoltaic string.

Figure 11:
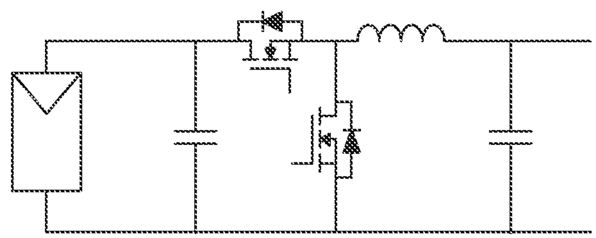
FIG. 11 is a schematic structural diagram of a buck-type optimizer serving as an MLPE apparatus in a photovoltaic system according to an embodiment of the present disclosure.
Figure 12:
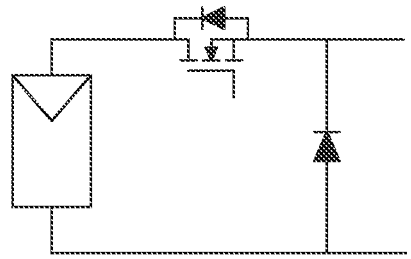
FIG. 12 is a schematic structural diagram of a rapid shutdown device serving as an MLPE apparatus in a photovoltaic system according to an embodiment of the present disclosure.

In practice, the MLPE apparatus may be: a power optimizer configured to perform maximum power point tracking (MPPT) on a photovoltaic module, a rapid shutdown device configured to switch on and off a photovoltaic module, or a module monitor. In such cases, outputs of the main circuit 110 of all MLPE apparatuses in a same photovoltaic string are connected in series. The power optimizer includes a direct-current (DC) power optimizer or an alternating-current (AC) power optimizer. The DC power optimizer converts a low-voltage DC input into a low-voltage DC output, and the low-voltage DC outputs are connected in series to acquire a high-voltage DC output. The AC power optimizer converts a low-voltage DC input into a low-voltage AC output, and the low-voltage AC outputs are connected in series to acquire a high-voltage AC output. The MLPE apparatus may alternatively be a micro inverter. In such case, outputs of the main circuits 110 of all MLPE apparatuses in a same photovoltaic string are connected in parallel. The present disclosure is not limited to the above examples. Reference is made to FIG. 11 and FIG. 12, which show schematic structures of a Buck optimizer and a rapid shutdown device, respectively.

Other principles may refer to the description of the aforementioned embodiments and are not repeated herein.

Figure 13:
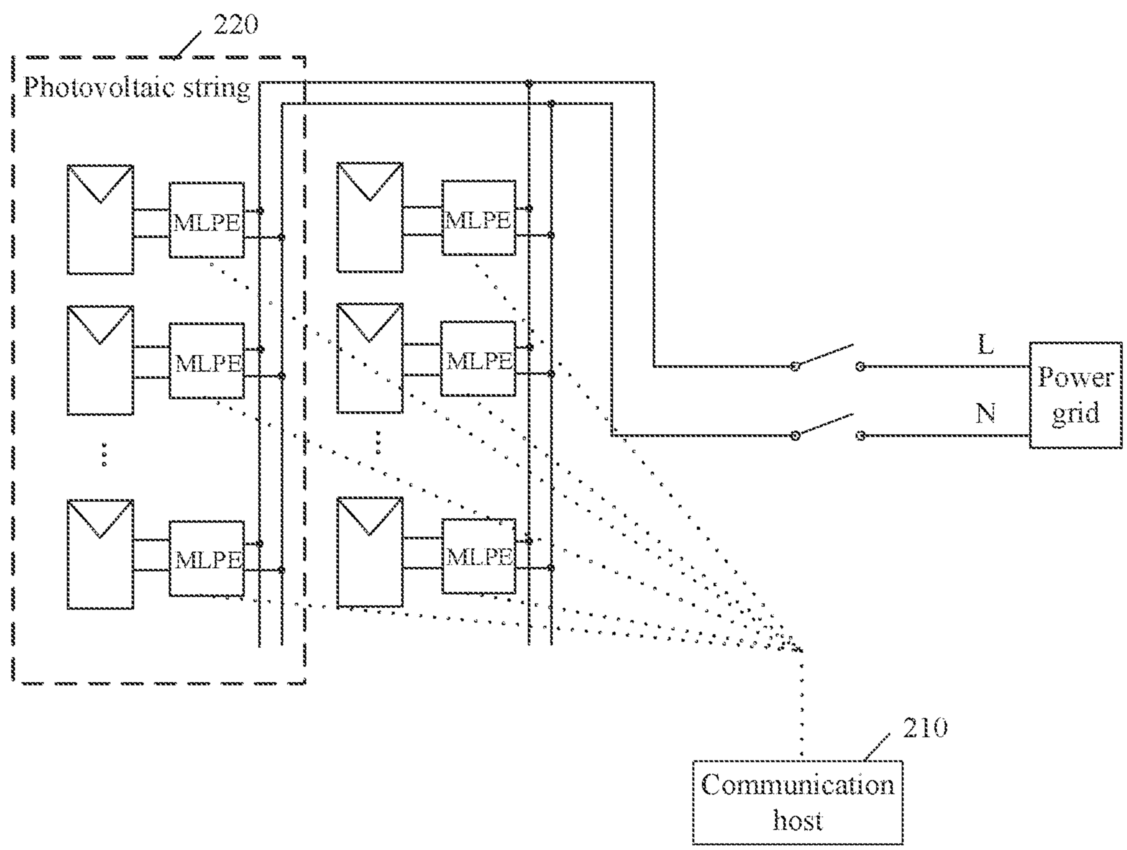
FIG. 13 is a schematic structural diagram of a photovoltaic system according to an embodiment of the present disclosure.

A photovoltaic system is further provided according to another embodiment of the present disclosure. A schematic structural diagram of the system may be as shown in FIG. 13. The system includes a communication host 210 and at least one photovoltaic string 220.

Figure 14:
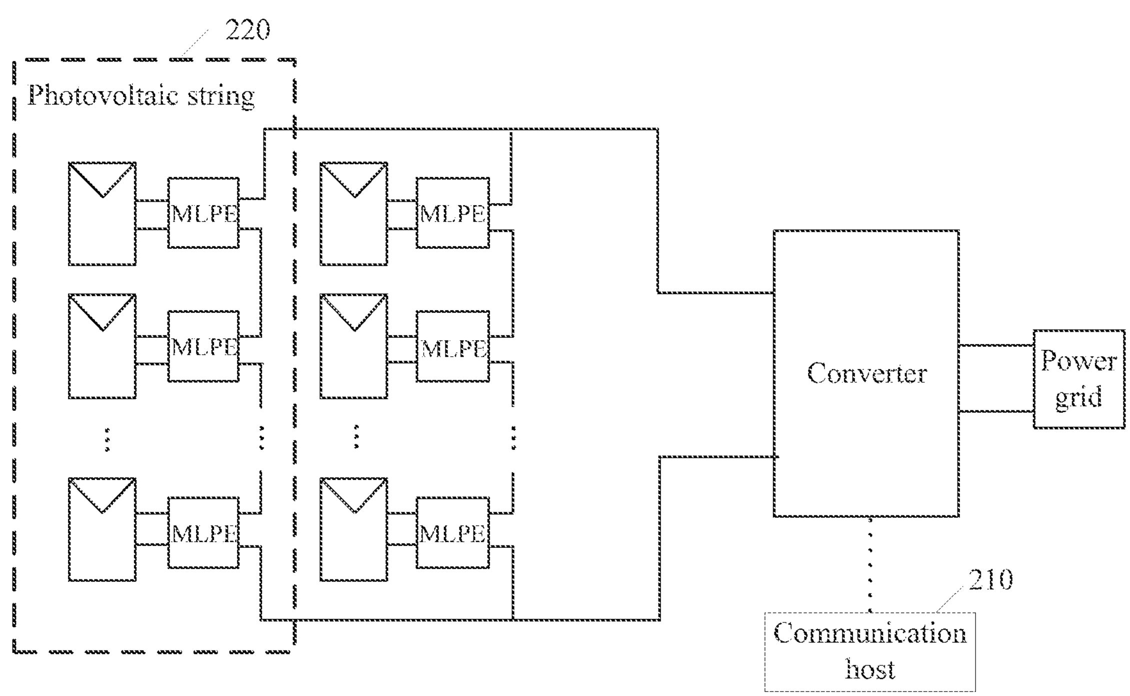
FIG. 14 is a schematic structural diagram of a photovoltaic system provided with a converter according to an embodiment of the present disclosure.

The photovoltaic string 220 includes multiple photovoltaic modules that are connected in parallel (as shown in FIG. 13) or in series (as shown in FIG. 14) via corresponding MLPE apparatuses. The communication host 210 receives the rank of the accumulated operation duration reported by each MLPE apparatus, and determines the physical location of each photovoltaic module or each MLPE apparatus according to the rank of the accumulated operation duration of each MLPE apparatus and a sequence of installing positions of the devices in the photovoltaic string 220. The devices are installed at the installing positions based on the sequence. The communication host 210 is communication connection with the MLPE apparatuses, and is configured perform any aforementioned method for locating the devices in the photovoltaic string.

In case of the micro inverter, outputs of the MLPE apparatus may be directly connected into a power grid, and there may be no converter in a post-stage of the MLPE apparatus (as shown in FIG. 13). In case of the Buck optimizer or the rapid shutdown device, it is necessary to arrange a converter in a post-stage of the MLPE apparatus, so as to convert DC power of the photovoltaic string into AC power and transmit the AC power to a grid (as shown in FIG. 14). The converter may be a DC-DC converter or a DC-AC converter, for example, a photovoltaic inverter or an energy-storage current transformer. The present disclosure is not limited to the above examples. In case of the AC optimizers, low-voltage AC outputs of the MLPE apparatus are connected in series to form a high-voltage AC output, which may be directly connected into a power grid. In such case, the converter in the post-stage of the MLPE apparatus as shown in FIG. 14 may not be necessary In a case that the system includes multiple photovoltaic strings 220, ranking of the MLPE apparatuses may be performed among all photovoltaic strings 220, and alternatively may be performed in each photovoltaic string 220 separately. In the latter case, a result of the ranking of each photovoltaic string 220 is mapped to the corresponding photovoltaic string 220 at the communication host 210.

The communication host 210 may be a controller in the photovoltaic system, such as a system controller or an internal controller of a converter. Alternatively, the communication host 210 may be a near-end controller in communication connection with a controller in the photovoltaic system, such as a local personal computer (PC). Alternatively, the communication host 210 may be a remote server, a cloud server, or a display terminal (such as a mobile phone), which in communication connection with any aforementioned controller. The present disclosure is not limited to the above examples.

The communication host 210 may communicate with a post-stage converter or each MLPE apparatus through wired communication (for example, under RS485 standards or the Ethernet technology), wireless communication (for example, under WIFI, Bluetooth, ZigBee, or LoRa), or a power line carrier communication, all of which fall within the protection scope of the present disclosure.

Other principles may refer to the description of the aforementioned embodiments, and are not repeated herein.

In embodiments of the present disclosure, the photovoltaic string is a part of a photovoltaic array, and further a part of a photovoltaic system. Hence, the aforementioned device in the photovoltaic string may be regarded as a device in the photovoltaic array or a device in the photovoltaic system. The method for locating the devices in the photovoltaic string may be regarded as a method for locating devices in the photovoltaic array, or a method for locating devices in the photovoltaic system.

The embodiments of the present disclosure are described in a progressive manner, and each embodiment places emphasis on the difference from other embodiments. Therefore, one embodiment can refer to other embodiments for the same or similar parts. Since the systems disclosed in the embodiments correspond to the methods disclosed in the embodiments, the description of the systems is simple, and reference may be made to the relevant part of the methods. The systems and embodiments of the systems described herein are merely illustrative. Units described as separate components may be or may not be physically separated. Components shown as units may be or may not be physical units, that is, they may be located in one location or may be distributed among multiple network units. A part or all of the modules may be selected based on an actual condition, in order to implement technical solutions of the present disclosure. Those skilled in the art can understand and carry out the technical solutions without any creative effort.

As further be appreciated by those skilled in the art, the units and algorithmic steps in the examples described according to the embodiments disclosed herein can be implemented in forms of electronic hardware, computer software or the combination of the both. To illustrate the interchangeability of the hardware and the software clearly, the components and the steps in the examples are described generally according to functions in the above description. Whether hardware or software is used to implement the functions depends on a specific application and design constraints for the technical solution. For each specific application, different methods may be used by those skilled in the art to implement the described function, and such implementation should not be considered to depart from the scope of this invention According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

The invention claimed is:

1. A method for ranking module level power electronic (MLPE) apparatuses, wherein the MLPE apparatuses are in communication connection with each other in a photovoltaic system, and the method comprises:

sending, by each MLPE apparatus according to a predetermined rule, an initial message to each other MLPE apparatus, wherein the initial message comprises a serial number corresponding to said MLPE apparatus and an accumulated operation duration of said MLPE apparatus;

determining, by the MLPE apparatuses, a rank of the accumulated operation duration of each MLPE apparatus according to the initial messages sent from all MLPE apparatuses, wherein during the determining, one of the MLPE apparatuses updates an interim rank of the respective accumulated operation duration according to the initial message of another of the MLPE apparatuses;

communicating, by the MLPE apparatuses, with a communication host of the photovoltaic system; and reporting, by the MLPE apparatuses, the rank of the accumulated operation duration of each MLPE apparatus to the communication host.

2. The method according to claim 1, wherein:

the initial message further comprises the interim rank of the accumulated operation duration; and determining, by the MLPE apparatuses, the rank of the accumulated operation duration of each MLPE apparatus according to the initial messages sent from all MLPE apparatuses comprises:

in response to each MLPE apparatus receiving a ranking message, comparing, by said MLPE apparatus, the accumulated operation duration comprised in the ranking message with the accumulated operation duration of said MLPE apparatus to obtain a first comparing result; and determining, by said MLPE apparatus based on the first comparing result, whether to adjust the interim rank of the accumulated operation duration of said MLPE apparatus;

wherein the ranking message is the initial message sent from any other MLPE apparatus.

3. The method according to claim 2, wherein:

the interim rank comprised in the ranking message is identical to the interim rank of the accumulated operation duration of said MLPE apparatus;

determining, by said MLPE apparatus, whether to adjust the interim rank of the accumulated operation duration of said MLPE apparatus based on the result of the comparing comprises:

increasing the interim rank of the MLPE apparatus by 1, in response to the accumulated operation duration of said MLPE apparatus being shorter than the accumulated operation duration comprised in the ranking message; and keeping the interim rank of the MLPE apparatus unchanged, in response to the accumulated operation duration of said MLPE apparatus being longer than the accumulated operation duration comprised in the ranking message; and determining, by the MLPE apparatuses, the rank of the accumulated operation duration of each MLPE apparatus according to the initial messages sent from all MLPE apparatuses further comprises:

determining, by each MLPE apparatus, whether the interim rank comprised in each initial message received within a preset period is different from the interim rank of said MLPE apparatus; and determining, by each MLPE apparatus, the interim rank of said MLPE apparatus as the rank of the accumulated operation duration of said MLPE apparatus, in response to determining that the interim rank comprised in each initial message received within the preset period being different from the interim rank of said MLPE apparatus.

4. The method according to claim 1, further comprising, for each MLPE apparatus in response to receiving a ranking message:

storing the interim rank and the accumulated operation duration comprised in the ranking message;

in response to the interim rank comprised in the ranking message being identical to the interim rank of the accumulated operation duration of said MLPE apparatus, comparing the accumulated operation duration comprised in the ranking message with the accumulated operation duration of said MLPE apparatus to obtain a first comparing result, and increasing, by 1, the interim rank of a MLPE apparatus corresponding to the shorter accumulated operation duration in the first comparing result; and in response to the interim rank comprised in the ranking message being identical to any interim rank stored in said MLPE apparatus, comparing the accumulated operation duration comprised in the ranking message with the accumulated operation duration corresponding to said interim rank stored in said MLPE apparatus, to obtain a second comparing result, and increasing, by 1, the interim rank of a MLPE apparatus corresponding to the shorter accumulated operation duration in the second comparing result;

wherein the ranking message is the initial message sent from any other MLPE apparatus;

wherein determining, by the MLPE apparatuses, the rank of the accumulated operation duration of each MLPE apparatus according to the initial messages sent from all MLPE apparatuses further comprises:

determining, by each MLPE apparatus, whether the interim rank comprises in each initial message received within a preset period is identical to the stored interim rank of an MLPE apparatus sending said initial message; and determining, by the MLPE apparatuses, the interim rank of each MLPE apparatus as the rank of the accumulated operation duration of said MLPE apparatus, in response to each MLPE apparatus determining that the interim rank comprised in each ranking message received within a preset period is identical to the stored interim rank of an MLPE apparatus sending said ranking message.

5. The method according to claim 1, wherein before sending, by each MLPE apparatus according to the predetermined rule, the initial message to each other MLPE apparatus, the method further comprises:

stopping, by the MLPE apparatuses synchronously, timing the accumulated operation durations.

6. The method according to claim 5, wherein stopping, by the MLPE apparatuses synchronously, timing the accumulated operation durations comprises:

stopping, by the MLPE apparatuses synchronously, timing the accumulated operation durations in response to detecting a timing-stop signal.

7. The method according to claim 6, wherein after the MLPE apparatuses stopping timing the accumulated operation durations synchronously, the method comprises:

determining, by the MLPE apparatuses, whether a timing-start signal is detected;

resuming, by the MLPE apparatuses, timing the accumulated operation durations in response to determining that the timing-start signal is detected; and stopping, by the MLPE apparatuses synchronously, timing the accumulated operation durations in response to determining that the timing-stop signal is detected again.

8. The method according to claim 5, wherein sending, by each MLPE apparatus according to the predetermined rule, the initial message to each other MLPE apparatus comprises:

sending, by each MLPE apparatus, the initial message in response to a random period lapsing after stopping timing the respective accumulated operation duration.

9. The method according to claim 5, wherein sending, by each MLPE apparatus according to the predetermined rule, the initial message to each other MLPE apparatus comprises:

sending, by each MLPE apparatus, the initial message in response to a corresponding preset period lapsing after stopping timing the respective accumulated operation duration.

10. The method according to claim 9, wherein the corresponding preset period is determined by the respective accumulated operation duration of said MLPE apparatus, or a serial number corresponding to said MLPE apparatus.

11. The method according to claim 5, wherein sending, by each MLPE apparatus according to the predetermined rule, the initial message to each other MLPE apparatus comprises:

in response to receiving the respective accumulated operation duration from any other of the MLPE apparatuses, determining a sending time based on a difference between the received accumulated operation duration and the accumulated operation duration of said MLPE apparatuses, and sending the initial message at the sending time.

12. A method for locating devices in a photovoltaic string, wherein in the photovoltaic string comprises module level power electronic (MLPE) apparatuses that are in communication connection with each other in a photovoltaic system, each of the devices corresponds to one of the MLPE apparatuses, and the method comprises:

sending, by each MLPE apparatus according to a predetermined rule, an initial message to each other MLPE apparatus, wherein the initial message comprises a serial number corresponding to said MLPE apparatus and an accumulated operation duration of said MLPE apparatus;

determining, by the MLPE apparatuses, a rank of the accumulated operation duration of each MLPE apparatus according to the initial messages sent from all MLPE apparatuses, wherein during the determining, one of the MLPE apparatuses updates an interim rank of the respective accumulated operation duration according to the initial message of another of the MLPE apparatuses;

communicating, by the MLPE apparatuses, with a communication host of the photovoltaic system; and reporting, by the MLPE apparatuses, the rank of the accumulated operation duration of each MLPE apparatus to the communication host; and determining, by a communication host in the photovoltaic system, a physical location of each of the devices in the photovoltaic string, according to the rank of the accumulated operation duration of each MLPE apparatus and a sequence of installing positions of the devices in the photovoltaic string;

wherein the devices are installed at the installing positions based on the sequence.

13. The method according to claim 12, wherein determining, by the communication host, the physical location of each of the devices in the photovoltaic string comprises:

acquiring, by the communication host, a sequence of the MLPE apparatuses according to the rank of the accumulated operation duration of each MLPE apparatus; and mapping, by the communication host, the sequence of the MLPE apparatuses to the sequence of installing positions of the devices in the photovoltaic string, to determine the physical location of each of the devices.

14. The method according to claim 12, wherein the devices in the photovoltaic string are photovoltaic modules, or the MLPE apparatuses in a post-stage of photovoltaic modules.

* * * * *